Sept. 23, 1958   W. A. DE JONG   2,853,532
CONVERSION OF ORGANIC HYDROPEROXIDES TO CARBINOLS
Filed May 28, 1956   2 Sheets-Sheet 1
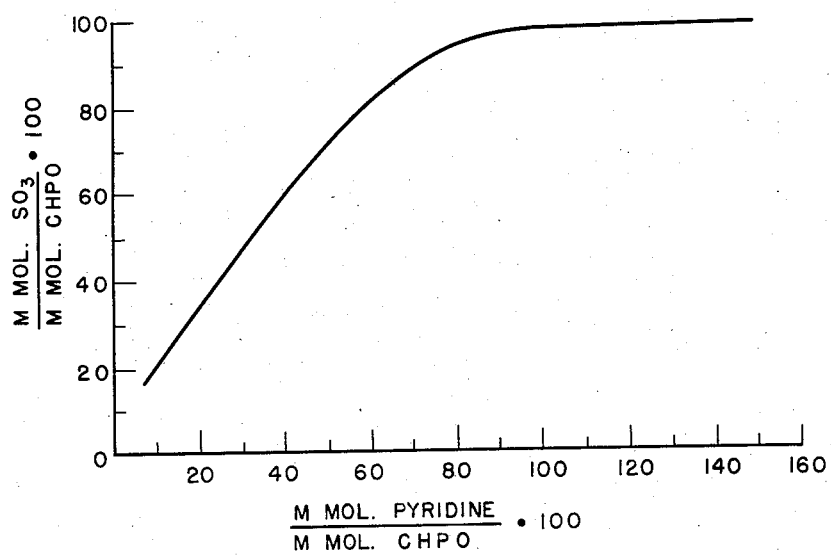
FIG. I
EFFECT OF PYRIDINE CONCENTRATION UPON
$SO_3$ FORMATION FROM $SO_2$ AND CHPO
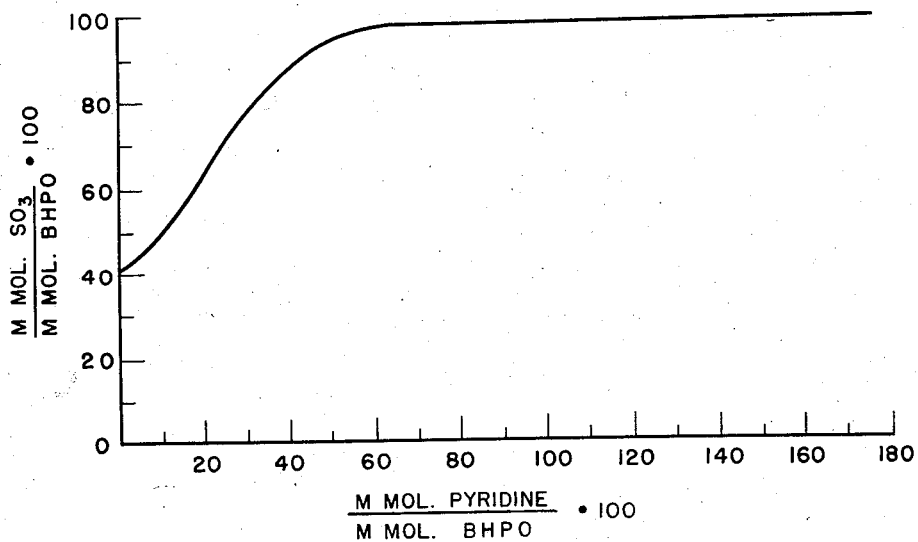
FIG. II
EFFECT OF PYRIDINE CONCENTRATION UPON
$SO_3$ FORMATION FROM $SO_2$ AND BHPO
INVENTOR:
WILLEM ALEXANDER DE JONG
BY:
HIS AGENT Sept. 23, 1958  W. A. DE JONG  2,853,532
CONVERSION OF ORGANIC HYDROPEROXIDES TO CARBINOLS
Filed May 28, 1956  2 Sheets-Sheet 2
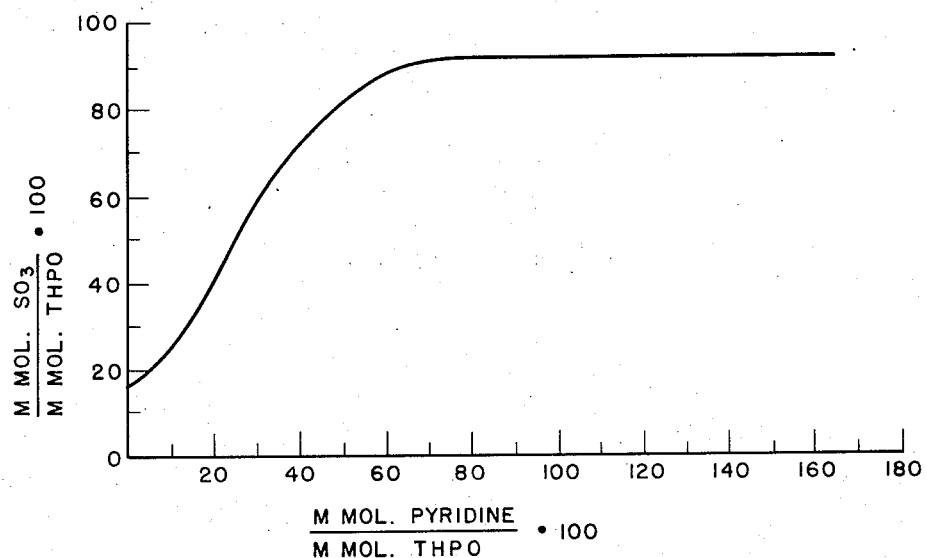
FIG. III
EFFECT OF PYRIDINE CONCENTRATION UPON
SO$_3$ FORMATION FROM SO$_2$ AND THPO
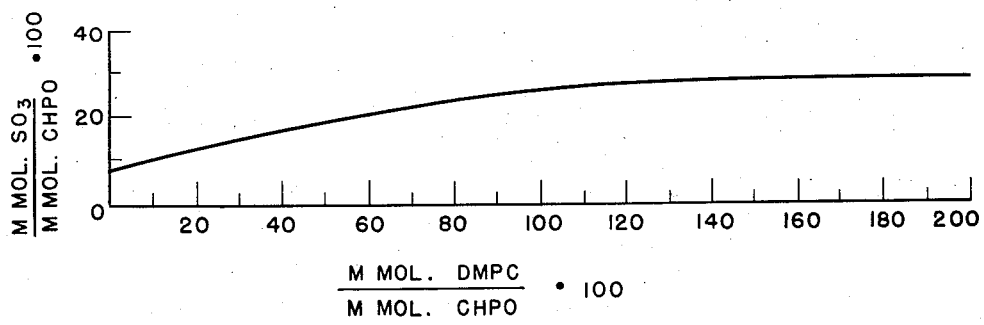
FIG. IV
EFFECT OF DMPC CONCENTRATION UPON THE
SO$_3$ FORMATION FROM SO$_2$ AND CHPO
INVENTOR:
WILLEM ALEXANDER DE JONG
BY:
HIS AGENT

United States Patent Office 2,853,532
Patented Sept. 23, 1958

---

2,853,532

CONVERSION OF ORGANIC HYDROPEROXIDES TO CARBINOLS

Willem Alexander De Jong, Amsterdam, Netherlands, assignor to Shell Development Company, New York, N. Y., a corporation of Delaware Application May 28, 1956, Serial No. 587,652

Claims priority, application Netherlands May 31, 1955

13 Claims. (Cl. 260—618)

This invention relates to the production of alcohols and relates more particularly to improvements in the conversion of organic hydroperoxides to the corresponding carbinols.

Methods have been disclosed heretofore directed to the production of carbinols from organic hydroperoxides. Thus, it is known, for example, that by reduction of hydroperoxides by means of alkali sulfites or -bisulfites corresponding alcohols may be obtained. By using these compounds it is, for example, possible to obtain $\alpha,\alpha'$-dimethyl phenyl carbinol or $\alpha$-tetralol from cumene hydroperoxide or tetralin hydroperoxide, respectively. It has also been found that the reaction of certain hydroperoxides with certain specific amine compounds under given conditions results in interaction with the formation of carbinol-containing reaction mixtures. Methods such as disclosed heretofore, however, often have distinct drawbacks which detract materially from their efficient practical scale application. These difficulties comprise among others relatively slow reaction rates necessitating a reaction time of over several hours to attain the high yields essential to practical scale operation.

It is also known that if an aralkyl-$\alpha$-hydroperoxide is contacted with $SO_2$ the hydroperoxide employed is rapidly decomposed into phenols and aliphatic carbonyl compounds. When, for instance, cumene hydroperoxide is used as the aralkyl-$\alpha$-hydroperoxide practically quantitative amounts of phenol and acetone are quickly obtained by the above controlled reaction. Without intent to limit in anywise the scope of the presently claimed invention by theory advanced herein to set forth more clearly the nature of the invention, it is believed that this decomposition reaction can be regarded as a chain reaction which is initiated by even traces of $SO_3$. These traces of $SO_3$ will be present since the hydroperoxide readily oxidizes $SO_2$ to $SO_3$; the hydroperoxide taking part in this oxidation being reduced to the corresponding carbinol. When, for example, cumene hydroperoxide is decomposed to phenol and acetone by means of $SO_2$, the reaction mechanism may be represented as follows:

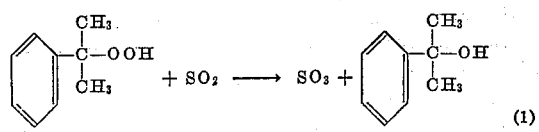

(1)

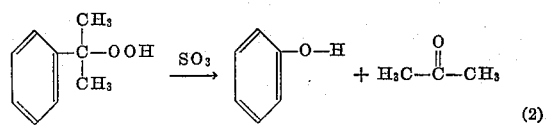

(2)

It has now been found that approximately 5 mole percent of the cumene hydroperoxide is converted according to reaction (1) and approximately 95 mole percent according to the reaction (2), if, the initial concentration of the hydroperoxide used is not less than 0.1 mole per liter. With lower hydroperoxide concentrations the percentage of cumene hydroperoxide converted according to reaction (1) increases as the hydroperoxide concentration decreases. A solvent was used for the above decomposition reactions which, under the conditions used, did not react with the hydroperoxide and had no basic properties, so that it was not able to react with the $SO_3$ formed. Suitable examples of such solvents are the paraffinic and aromatic hydrocarbons such as, for example, pentane, heptane, benzene, toluene, cumene, etc.

It has now furthermore been found that the above reaction (2) can be entirely or almost entirely suppressed by carrying out foregoing reaction (1) in the presence of a compound which is inert with respect to the hydroperoxide and capable of acting as an acceptor for the $SO_3$ produced.

In accordance with the present invention alcohols are produced by contacting the corresponding hydroperoxide with $SO_2$ in the presence of a compound which is capable of acting as acceptor for the $SO_3$ and which is inert with respect to the hydroperoxide.

Any type of organic hydroperoxide may be converted to the corresponding carbinol in accordance with the invention. Suitable organic hydroperoxides which may be employed comprise those capable of conversion to primary, secondary or tertiary alcohols by conversion of the peroxidic group (—O—O—H) to a hydroxy group (—OH). Suitable organic hydroperoxides comprise the aromatic, aliphatic and cycloaliphatic hydroperoxides. A particularly desirable class of suitable organic hydroperoxides comprises that wherein the peroxidic group is directly attached to a tertiary carbon atom. These comprise, for example, organic compounds containing a tertiary carbon atom of aliphatic character represented by the general formula

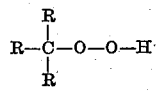

wherein each R represents a like or different alkyl, aryl, aralkyl, alicyclic or heterocyclic radical, two of which together may form an alicyclic ring compound. Examples of such suitable organic hydroperoxides include the tertiary alkyl hydroperoxides such as tertiary butyl hydroperoxide, 2-methyl butane hydroperoxide, 2,3-dimethyl butane hydroperoxide, 2,4-dimethyl pentane hydroperoxide, etc.; the aralkyl hydroperoxides such as cumene hydroperoxide, $\alpha,\alpha$-dimethyl-p-methylbenzyl hydroperoxide, $\alpha,\alpha$-dimethylnaphthyl hydroperoxide, the hydroperoxides of di-isopropyl benzene, of di-isopropyl naphthalene, etc. Examples of other suitable organic hydroperoxides comprise the cyclo-aliphatic hydroperoxides such as cyclohexyl hydroperoxide, methyl cyclopentyl hydroperoxide, etc. Still further examples of suitable organic hydroperoxides include tetrahydronaphthalene hydroperoxide, etc.

The organic peroxide charge to the process need not necessarily be a pure compound but may comprise materials such as, for example, the parent hydrocarbon from which the hydroperoxide is derived, or other hydrocarbons inert with respect to the hydroperoxide components of the reaction mixture.

Acceptors for the $SO_3$ employed in the process of the invention comprise organic compounds which are inert with respect to the hydroperoxide component under the conditions employed but which will bind and/or react with the $SO_3$ to form inert complexes or reaction products. Suitable acceptors for the $SO_3$ comprise, for example, alkaline-reacting nitrogen compounds such as, for example, aniline, quinoline, urea, ammonia and the like. Other suitable acceptors comprise the organic carbinols such as $\alpha,\alpha$-dimethyl phenyl carbinol. A suitable type of operation within the scope of the invention comprises the use of the carbinol product of the process as $SO_3$ acceptor. In this case product is continuously recycled to maintain the amount of carbinol in the reaction medium above the critical minimum set forth below. A particularly preferred $SO_3$ acceptor comprises pyridine. When the hydroperoxide charge emanates from a process step wherein pyridine is used to promote the oxidation of an aralkyl hydrocarbon (for example, as disclosed and claimed in U. S. Patent No. 2,734,086), substantially the entire aralkyl oxidation products comprising the aralkyl peroxide, unconverted aralkyl hydrocarbon and pyridine may be contacted with $SO_2$ in accordance with the present invention.

The reaction is preferably executed in the presence of a solvent which is inert under the conditions of execution of the reaction. Suitable solvents comprise, for example, paraffinic and aromatic hydrocarbons such as, for example, pentane, hexane, heptane, octanes, benzene, toluene, xylenes, etc. Mixtures of organic hydroperoxides and mixtures of solvents and/or $SO_3$ acceptors may be employed within the scope of the invention.

The yield of the carbinol product will vary with variations in the ratio of the concentration of $SO_3$ acceptor to organic hydroperoxide in the reaction mixture. Thus, the yield is found to vary directly with the mole ratio of $SO_3$ acceptor to organic hydroperoxide up to a well-defined value of this ratio. Above this critical maximum value no substantial increase in yield is generally encountered. The specific amount of $SO_3$ acceptor below which the maximum yield can no longer be attained will vary somewhat in accordance with the specific compound used as acceptor. It has been found that generally the maintenance of the mole ratio of $SO_3$ acceptor to organic hydroperoxide in the reaction mixture at a value of about one or greater enables the reaction to proceed efficiently with substantially maximum yield of desired alcohol at an exceedingly rapid reaction rate. Somewhat lower ratios may, however, be employed within the scope of the invention. In the conversion of organic hydroperoxide to carbinols in accordance with the invention using pyridine as acceptor with a hydroperoxide concentration of from about 0.06 to about 0.07 mole per liter the critical value of the mole ratio of pyridine to organic hydroperoxide below which the maximum yield of carbinol was no longer attainable was found to be in the range of from about 0.08 to about 1 when converting cumene hydroperoxide, about 0.6 for tertiary butyl hydroperoxide, and about 0.7 for $\alpha$-tetrahydronaphthalin hydroperoxide. The use of the acceptor in amounts resulting in a mole ratio of acceptor to hydroperoxide in excess of about two need usually not be resorted to. The use of the acceptor in such amounts or in somewhat greater amounts is, however, comprised within the scope of the invention.

The $SO_2$ is preferably used in a quantity which is approximately the molar equivalent of the quantity of hydroperoxide used. The use of the $SO_2$ in greater or lesser amounts is, however, comprised within the scope of the invention. If the $SO_3$ acceptor or binding substance used dissolves the organic hydroperoxide component, the reaction may be executed in the presence of such an $SO_3$ binding substance without the addition of any substantial amount of other solvent.

The reaction is generally carried out at a temperature of between about $-80°$ C. and about $100°$ C. Preferred reaction temperatures are, however, between $20°$ C. and $70°$ C. The $SO_2$ to be used according to the invention can be added to the hydroperoxide in solution, in an indifferent solvent such as a paraffinic hydrocarbon, for example, heptane, or in gas form. A suitable embodiment of the reaction is that in which gaseous $SO_2$ is contacted with a thin layer of the hydroperoxide. This method of executing the reaction is usually effected in a reactor enabling the flow of the liquid charge in the form of a film therethrough. The reaction is generally carried out under atmospheric pressure. Sub-atmospheric or super-atmospheric pressures may, however, be employed within the scope of the invention.

If the process according to the invention is carried out in an anhydrous medium salts insoluble in the reaction medium may at times be formed and precipitate in crystalline form. In some cases alcohols formed may also be precipitated. This is the case, for example, when cumene hydroperoxide is reduced in the presence of pyridine, in which case the $SO_3$ produced forms with pyridine a salt which is insoluble in an anhydrous medium. The pyridine salt can be brought into solution by adding water, the alcohol formed then separating as upper layer. Pyridine is recovered from the aqueous solution by alkalizing the solution and thereafter subjecting it to steam distillation.

If desired, water may be added to the hydroperoxide before the reaction of the hydroperoxide with $SO_2$.

The contact time employed may vary considerably within the scope of the invention. In general a contact time in excess of five minutes need not be exceeded and a reaction time or from about 0.5 to about 2 minutes will be sufficient. Higher or lower contact times may, however, be employed within the scope of the invention.

Under the above-defined conditions the organic hydroperoxide charge is converted efficiently with exceedingly short contact time and with high yields to the corresponding organic carbinols. Thus, cumene hydroperoxide is converted to $\alpha,\alpha$-dimethyl benzyl alcohol and tertiary butyl hydroperoxide to tertiary butyl alcohol, respectively, with yields of 99 to 100% mole; $\alpha$-tetrahydronaphthalene has been converted to $\alpha$-tetralol with yields of 92 mole percent; cyclohexyl hydroperoxide is readily converted to cyclohexanol; similarly other organic hydroperoxides are converted to the corresponding alcohols in accordance with the invention.

The invention is further illustrated by the following examples.

EXAMPLE I

The following experiments illustrate the effect of pyridine concentration on the formation of $SO_3$ from cumene hydroperoxide (CHPO) and $SO_2$.

Seven solutions were prepared in pentane, each one of 25 ml. and containing 1.642 millimols of 100% CHPO (dissolved in 10 ml. of heptane and varying quantities of pyridine (see Table I below)). To each solution there was added 30 ml. of pentane saturated with $SO_2$ at room temperature. After intensive shaking for 2 minutes ten drops of water were added (in order to prevent any sulfonation of the aromatic nucleus). After shaking for a further 2 minutes the pentane and the unconverted $SO_2$, as well as a part of the heptane, were removed by evaporation on a steam bath. The remaining $SO_2$-free solutions were diluted with a mixture of equal quantities of benzene and ethanol, after which electrometrical titration was carried out with alcoholic NaOH. The results are shown in Table I below.

*Table I*

| Solution No. | Quantity of Pyridine in Millimols | Quantity of $SO_3$ Formed in Millimols | $\dfrac{\text{Millimols Pyridine}}{\text{Millimols CHPO}} \cdot 100$ | $\dfrac{\text{Millimols } SO_3}{\text{Millimols CHPO}} \cdot 100$ |
|---|---|---|---|---|
| 1 | 0.160 | 0.325 | 9.8 | 19.8 |
| 2 | 0.347 | 0.579 | 21.1 | 35.3 |
| 3 | 0.624 | 0.935 | 38.0 | 56.9 |
| 4 | 0.832 | 1.173 | 50.7 | 71.4 |
| 5 | 1.254 | 1.527 | 76.4 | 93.0 |
| 6 | 1.654 | 1.611 | 100.7 | 98.1 |
| 7 | 2.489 | 1.625 | 151.6 | 99.0 |

The values given in the last two columns are incorporated in the graph shown in Figure I, in which the X-axis indicates the number of $$\frac{\text{millimols of pyridine}}{\text{millimols of CHPO}} \cdot 100$$

and the Y-axis the number of $$\frac{\text{millimols of SO}_3}{\text{millimols of CHPO}} \cdot 100$$

Conversion of cumene hydroperoxide to $\alpha,\alpha$-dimethyl benzyl alcohol in accordance with the invention is effected as follows:

Cumene hydroperoxide is converted to $\alpha,\alpha$-dimethyl benzyl alcohol by dissolving cumene hydroperoxide in heptane and adding pyridine to obtain a mole ratio of pyridine to cumene hydroperoxide of one in the resulting admixture. To this solution there is added pentane saturated with $SO_2$ in an amount resulting in a mole ratio of $SO_2$ to cumene hydroperoxide of about one. The resulting mixture is then agitated for 2 minutes. Water in an amount of about 10% by volume of the reaction mixture is added and the agitation resumed for another two minutes. Thereafter, the reaction mixture is allowed to stratify and the organic layer is subjected to evaporation to remove residual $SO_2$ and hydrocarbons therefrom. Conversion of cumene hydroperoxide to $\alpha,\alpha$-dimethyl benzyl alcohol with a yield of about 98 mole percent is thus obtained.

EXAMPLE II

The following experiments were carried out to illustrate the effect of pyridine concentrations on the $SO_3$ formation in the presence of tertiary butyl hydroperoxide (BHPO) and $SO_2$.

In the manner described in Example I, eight solutions of 25 ml. each were prepared with pentane, varying quantities of 92.7% BHPO and varying quantities of pyridine (see Table II below). The resultant solutions were treated in the same way as in Example I. The results are shown in Table II below.

Table II

| Solution No. | Quantity of BHPO in Millimols (100%) | Quantity of Pyridine in Millimols | Quantity of $SO_3$ Formed in Millimols | $\frac{\text{Millimols Pyridine}}{\text{Millimols BHPO}} \cdot 100$ | $\frac{\text{Millimols SO}_3}{\text{Millimols BHPO}} \cdot 100$ |
|---|---|---|---|---|---|
| 1 | 1.543 | ---- | 0.636 | ---- | 41.2 |
| 2 | 1.521 | 0.168 | 0.818 | 11.0 | 53.8 |
| 3 | 1.527 | 0.367 | 1.013 | 24.0 | 66.3 |
| 4 | 1.524 | 0.645 | 1.433 | 42.3 | 94.0 |
| 5 | 1.554 | 0.874 | 1.528 | 56.2 | 98.3 |
| 6 | 1.523 | 1.292 | 1.515 | 84.8 | 99.5 |
| 7 | 1.702 | 1.795 | 1.672 | 105.5 | 98.2 |
| 8 | 1.521 | 2.586 | 1.549 | 170.0 | 100 |

A graph of the values given in the last two columns is shown in Figure II, in which the X-axis indicates the number of $$\frac{\text{millimols of pyridine}}{\text{millimols of BHPO}} \cdot 100$$

and the Y-axis represents the number of $$\frac{\text{millimols of SO}_3}{\text{millimols of BHPO}} \cdot 100$$

From this figure it will be seen that the molar ratio of the $SO_3$ formed to BHPO remains constant if the molar ratio of pyridine to BHPO is about 0.6 or higher.

The following operation is illustrative of the conversion of tertiary butyl hydroperoxide to tertiary butyl alcohol in accordance with the invention:

To tertiary butyl hydroperoxide dissolved in heptane there is added sufficient pyridine to obtain a mole ratio of pyridine to tertiary butyl hydroperoxide of 0.6 in the resulting solution. Pentane saturated wtih $SO_2$ is added to the solution in an amount resulting in substantially equimolar amounts of $SO_2$ and tertiary butyl hydroperoxide in the resulting admixture. The mixture is then agitated for about two minutes at about 25° C. Water is added to the resulting reaction mixture and after brief agitation the mixture is permitted to stratify. The resulting supernatant organic layer separated and freed of residual $SO_2$ and solvent. Analysis of the residue indicated a practically quantitative yield of tertiary butyl alcohol was obtained.

EXAMPLE III

To illustrate the effect of pyridine concentration on the $SO_3$ formation from $\alpha$-tetralin hydroperoxide (THPO) and $SO_2$ the experiments described in Example I were repeated, $\alpha$-tetralin hydroperoxide with a purity of 93.3% being used as hydroperoxide. The further data, as well as the results of the experiments, are given in Table III below.

Table III

| Solution No. | Quantity of THPO in Millimols (100%) | Quantity of Pyridine in Millimols | Quantity of $SO_3$ Formed in Millimols | $\frac{\text{Millimols Pyridine}}{\text{Millimols THPO}} \cdot 100$ | $\frac{\text{Millimols SO}_3}{\text{Millimols THPO}} \cdot 100$ |
|---|---|---|---|---|---|
| 1 | 1.535 | ---- | 0.261 | ---- | 17.0 |
| 2 | 1.543 | 0.172 | 0.421 | 11.2 | 27.3 |
| 3 | 1.538 | 0.357 | 0.700 | 23.2 | 45.5 |
| 4 | 1.537 | 0.634 | 1.139 | 41.2 | 74.1 |
| 5 | 1.538 | 0.862 | 1.350 | 56.0 | 87.8 |
| 6 | 1.542 | 1.263 | 1.420 | 81.9 | 92.1 |
| 8 | 1.538 | 2.538 | 1.375 | 165.0 | 89.4 |

The values given in the last two columns are shown in Figure III, in which the X-axis indicates the number of $$\frac{\text{millimols of pyridine}}{\text{millimols of THPO}} \cdot 100$$

and the Y-axis the number of $$\frac{\text{millimols of SO}_3}{\text{millimols of THPO}} \cdot 100$$

It will be seen from this figure that the molar ratio of $SO_3$ formed to THPO reaches a practically constant value (about 0.9) when a molar ratio of pyridine to THPO of about 0.7 is used. When a molar ratio of pyridine and THPO of 7:10 was used $\alpha$-tetralol was obtained in a yield of about 90 mole percent.

The conversion of $\alpha$-tetrahydronaphthalene hydroperoxide to $\alpha$-tetralol in accordance with the invention is illustrated by the following operation:

To $\alpha$-tetrahydronaphthalene hydroperoxide dissolved in heptane there is added sufficient pyridine to result in a mole ratio of pyridine to $\alpha$-naphthalene hydroperoxide of 7:10. To this mixture there is added sufficient pentane saturated with $SO_2$ to obtain a mole ratio of $SO_2$ to the hydroperoxide of about one in the resulting admixture. The mixture is agitated for about two minutes at room temperature. Water is added and after further agitation for about two minutes the mixture is permitted to stratify. The resulting organic layer is freed of $SO_2$ and hydrocarbon solvents by evaporation. Analysis of the resulting residue indicates the obtaining of a 90 mole percent yield of $\alpha$-tetralol.

EXAMPLE IV

The effect of $\alpha,\alpha'$-dimethyl phenyl carbinol (DMPC) concentration on $SO_3$ formation from cumene hydroperoxide (CHPO) and $SO_2$ is illustrated by the following operation:

Eight heptane solutions were prepared, containing practically equal quantities of CHPO (100%). A varying quantity of DMPC heptane solution was added to each of these solutions. Each of the eight solutions thus obtained was made up with heptane to 25 ml. These solutions were further treated as described in Example I.

Further data as well as the results of the experiments are given in Table IV.

Table IV

| Solution No. | Quantity of CHPO in Millimols | Quantity of DMPC in Millimols | Quantity of SO₃ Formed in Millimols | $\frac{\text{Millimols DMPC}}{\text{Millimols CHPO}} \cdot 100$ | $\frac{\text{Millimols SO}_3}{\text{Millimols CHPO}} \cdot 100$ |
|---|---|---|---|---|---|
| 1 | 1.663 | --------- | 0.119 | ---------- | 7.2 |
| 2 | 1.650 | 0.165 | 0.169 | 10.0 | 10.2 |
| 3 | 1.647 | 0.330 | 0.213 | 20.0 | 12.9 |
| 4 | 1.653 | 0.587 | 0.265 | 35.5 | 16.0 |
| 5 | 1.647 | 0.817 | 0.296 | 49.6 | 18.0 |
| 6 | 1.653 | 1.236 | 0.376 | 74.8 | 22.8 |
| 7 | 1.650 | 1.644 | 0.408 | 99.6 | 24.7 |
| 8 | 1.650 | 3.295 | 0.486 | 199.7 | 29.5 |

The values given in the last two columns are shown in Figure IV, in which the X-axis indicates the number of $$\frac{\text{millimols of DMPC}}{\text{millimols of CHPO}} \cdot 100$$

and the Y-axis represents the number of $$\frac{\text{millimols of SO}_3}{\text{millimols of CHPO}} \cdot 100$$

It is seen from this figure that the molar ratio of SO₃ formed to CHPO approximates a constant value as the molar ratio of DMPC and CHPO increases.

In the conversion of cumene hydroperoxide (CHPO) in accordance with the invention using α,α-dimethyl phenyl carbinol (DMPC) as SO₃ acceptor in a molar ratio of DMPC to CHPO of one, the desired alcohol was obtained in a quantity of about 25 mole percent, calculated on the hydroperoxide. When the mole ratio of DMPC to CHPO was increased to two, the yield was raised to about 30 mole percent. As α,α'-dimethyl phenyl carbinol (DMPC) is also formed during the reaction, the reaction is preferably carried out by starting from a given molar ratio of DMPC to CHPO (see the relevant values in Table IV), which ratio is kept constant by recycling DMPC.

I claim as my invention:

1. The process for the conversion of an organic hydroperoxide to the corresponding carbinol compound which comprises contacting said organic hydroperoxide with SO₂ in about equimolar amounts at about −80 to about 100° C., in the presence of an acceptor compound for by-product SO₃ formed, selected from the group consisting of aniline, quinoline, urea, ammonia, alpha,alpha-dimethylphenyl carbinol and pyridine which acceptor compound is inert with respect to said hydroperoxide and forms a substantially inert reaction product with SO₃ under said conversion conditions and maintaining a mol ratio of said acceptor compound to said hydroperoxide at a value of at least one.

2. The process in accordance with claim 1 wherein said acceptor compound is pyridine.

3. The process in accordance with claim 1 wherein said acceptor compound is dimethyl phenyl carbinol.

4. The process for the conversion of a tertiary organic hydroperoxide wherein the peroxidic group is linked directly to a tertiary carbon atom to the corresponding carbinol compound wherein the hydroxy group is linked directly to a tertiary carbon atom which comprises, contacting said organic hydroperoxide with SO₂ in about equimolar amounts at about −80 to about 100° C., in the presence of an acceptor compound for by-product SO₃ formed selected from the group consisting of aniline, quinoline, urea, ammonia, alpha,alpha-dimethylphenyl carbinol and pyridine which acceptor compound is inert with respect to said hydroperoxide and forms a substantially inert reaction product with SO₃ under said conversion conditions, and maintaining the mole ratio of said acceptor compound to said hydroperoxide at a value of at least one.

5. The process for the conversion of an aromatic hydroperoxide to the corresponding aromatic carbinol which comprises contacting said aromatic hydroperoxide with SO₂ in about equimolar amounts at about −80 to about 100° C., in the presence of an acceptor compound for by-product SO₃, selected from the group consisting of aniline, quinoline, urea, ammonia, alpha,alpha-dimethylphenyl carbinol and pyridine which acceptor compound is inert with respect to said hydroperoxide and forms a substantially inert reaction product with SO₃ under said conversion conditions, and maintaining the mole ratio of said acceptor compound to said hydroperoxide at a value of at least one.

6. The process in accordance with claim 5, wherein said aromatic hydroperoxide is an aralkyl hydroperoxide.

7. The process in accordance with claim 6 wherein said acceptor compound is pyridine.

8. The process for the conversion of cumene hydroperoxide to α,α-dimethyl phenyl carbinol which comprises contacting said cumene hydroperoxide with SO₂ in about equimolar amounts at about 20 to about 70° C., in the presence of an acceptor compound for by-product SO₃, selected from the group consisting of aniline, quinoline, urea, ammonia, alpha,alpha-dimethylphenyl carbinol and pyridine which acceptor compound is inert with respect to said hydroperoxide and forms a substantially inert reaction product with SO₃ under said conversion conditions, and maintaining the mole ratio of said acceptor compound to said hydroperoxide at a value of at least one.

9. The process for the conversion of cumene hydroperoxide to α,α-dimethyl phenyl carbinol which comprises, contacting said cumene hydroperoxide with SO₂ in about equimolar amounts at about 20 to about 70° C., in the presence of pyridine, and maintaining the mole ratio of pyridine to cumene hydroperoxide at a value of at least one.

10. The process for the conversion of cumene hydroperoxide to α,α-dimethyl phenyl carbinol which comprises, contacting said cumene hydroperoxide with SO₂ in about equimolar amounts at about 20 to about 70° C., in the presence of α,α-dimethyl phenyl carbinol, and maintaining the mole ratio of α,α-dimethyl phenyl carbinol to cumene hydroperoxide at a value of at least one.

11. The process for the conversion of an aliphatic hydroperoxide to the corresponding aliphatic carbinol which comprises contacting said hydroperoxide with SO₂ in about equimolar amounts at a temperature of from about 20 to about 70° C., in the presence of an acceptor compound for by-product SO₃, selected from the group consisting of aniline, quinoline, urea, ammonia, alpha-alpha-dimethylphenyl carbinol and pyridine which acceptor compound is inert with respect to said hydroperoxide and forms reaction product with SO₃ which is inert under said conversion conditions, and maintaining the ratio of said acceptor compound to said hydroperoxide at a value of at least one.

12. The process for the conversion of an aliphatic hydroperoxide to the corresponding carbinol which comprises, contacting said hydroperoxide with SO₂ in about equimolar amounts at about 20 to about 70° C., in the presence of pyridine, and maintaining the mole ratio of pyridine to said hydroperoxide at a value of at least one.

13. The process in accordance with claim 12 wherein said aliphatic hydroperoxide is tertiary butyl hydroperoxide and said carbinol is tertiary butyl alcohol.

References Cited in the file of this patent

UNITED STATES PATENTS

| 2,593,761 | Johnstone | Apr. 22, 1952 |
| 2,626,281 | Joris | Jan. 20, 1953 |
| 2,645,656 | Oldham | July 14, 1953 |

FOREIGN PATENTS

| 656,112 | Great Britain | Aug. 15, 1951 |
| 705,640 | Great Britain | Mar. 17, 1954 |

OTHER REFERENCES

Hawkins: Quarterly Reviews, vol. 4 (1950), p. 253.